United States Patent [19]

Kido et al.

[11] Patent Number: 4,664,858

[45] Date of Patent: May 12, 1987

[54] MANUFACTURING METHOD OF A CERAMICS BODY HAVING THROUGH HOLES

[75] Inventors: Tomoyuki Kido; Toshihide Masuda, both of Kitakyushu, Japan

[73] Assignee: Kurosaki Refractories Co., Ltd., Fukuoka, Japan

[21] Appl. No.: 765,340

[22] Filed: Aug. 13, 1985

[30] Foreign Application Priority Data

Aug. 21, 1984 [JP] Japan .................................. 59-174692
Aug. 30, 1984 [JP] Japan .................................. 59-182271

[51] Int. Cl.⁴ .......................... C08J 9/26; B28B 7/34; B28B 1/26; B29C 61/00
[52] U.S. Cl. ........................................ 264/44; 264/86; 264/301; 264/312; 264/DIG. 44; 264/DIG. 71
[58] Field of Search ................. 264/44, 317, DIG. 44, 264/86, 301, DIG. 71

[56] References Cited

U.S. PATENT DOCUMENTS

| | | | |
|---|---|---|---|
| 3,574,646 | 4/1971 | Wismer et al. | 264/44 X |
| 3,666,526 | 5/1972 | Ettinger et al. | 264/44 X |
| 3,907,579 | 9/1975 | Ravault | 264/44 X |
| 3,939,002 | 2/1976 | Washbourne | 264/44 X |

*Primary Examiner*—Philip Anderson
*Attorney, Agent, or Firm*—Jordan and Hamburg

[57] ABSTRACT

A method of manufacturing a ceramic body having continuous three-dimension through-out holes which can be preferably employed as a filter for filtration of non-metallic inclusions in a molten metal and as a porous plug for introducing a gaseous medium for floating up the non-metallic inclusions. An organic body having a three-dimensional construction is placed in a casting mold, a slip of a ceramic material is poured into the mold, and after drying, the molded body is baked to effect decomposition of the organic porous body. Thus the ceramic body is provided with through-out holes communicating with to each other three-dimensionally together with a high mechanical strength.

15 Claims, 4 Drawing Figures

MANUFACTURING METHOD OF A CERAMICS BODY HAVING THROUGH HOLES

BACKGROUND OF THE INVENTION

1. Field of the Invention

This invention relates to a manufacturing method of a porous ceramic body having continuous three-dimensional through holes and which can be preferably used, for example, as a ceramic filter for filtrating non-metallic inclusion in a molten metal, and as a ceramic porous plug for floating up non-metallic inclusion in a molten metal by introducing a gaseous floating medium therefrom.

2. Description of the Prior Art

Recently, purification of a metal by using such a porous ceramic body is becoming more available. The features of a ceramic body necessary for the process depend on the shape of the through holes and the strength of the ceramic material from which the body is constructed.

It has been widely known that, as a manufacturing method, sinter ceramic materials have a larger diameter. A sintered body manufactured by this method, however, has not been suitable as regards the shape of the formed through holes because of the forming holes between each particle, and as regards the strength because of incomplete bonding of each particle.

Another manufacturing method to obtain a ceramic body includes pouring a ceramic slurry into a cavity having a laminated textile with a two dimensional net-like structure, which is dried and baked after taking out the cast body from the mold to decompose the textile. This is disclosed in a Japanese Patent Publication No.54-37617. Although, it is also difficult to obtain the through holes which communicate three-dimensionally with each other in the body after baking due to closing of the holes to be formed by the residue of the decomposing of the textile.

A purpose of this invention to provide a manufacturing method to obtain a ceramic body, in certainty, having through holes communicated three-dimensionally together and with high strength of the body itself.

SUMMARY OF THE INVENTION

An object of this invention is to produce a porous ceramic body by placing an organic porous body having a three-dimensional net-like structure in a casting mold, pouring a slurry or slip of a ceramic material into the mold and, after that, drying and baking or sintering the cast body.

Although any types of conventional casting molds can be employed as the casting mold for practicing this invention, a gypsum mold is most preferably used. A mold of gypsum functions to absorb water in the poured slurry to give cast body strength and the shaping ability, and it is not necessary to be strict in selecting the material and construction. Conventional gypsum molds that have been used in common casting can be used in this invention.

As the organic porous material to be placed in the casting mold, an organic material having a three-dimensional net-like cell construction provided with inner communicated spaces like urethane foam and polyethylene foam may be used.

Further, another feature of this invention is to utilize the resilient characteristics of an organic porous body. Distribution of the through holes, which directly affect the permeability of the produced ceramic body, can be regulated by contracting the organic porous body. In practice, the organic porous body is disposed in a contracted state before pouring the slurry, or the organic porous body is disposed in as its natural state and the body is contracted after pouring the slip into it, and, after that, drying and baking the body.

The rate of contraction is preferably $1/10 \sim \frac{1}{2}$ of the original volume of the organic porous body to thereby regulate the distribution of the formed through holes. By utilizing the step of contracting the organic porous body, the number of the through holes can be regulated without closing holes and without varying the diameter of the holes in the ceramic body being produced. Further, the bonding strength of the ceramic body produced is not impaired.

As a ceramic material employed in this invention, it may be any ceramic materials which can be prepared in a slip or slurry form such as, for example, fine powder of alumina, magnesia, zirconia, zircon, spinel, mullite and silicon carbide.

The particle size of the ceramic material is to be less than 325 mesh, and a higher strength can be obtained by increasing the ratio of submicron grade of the particle size which constitutes the ceramics material employed.

As the dispersion agent for preparing the casting slip, an inorganic agent such as sodium phosphates or an organic agent such as polyacrylic acids can be preferably used.

The content of the ceramic material in the slip is such as to keep the fluidity so that it can permeate into the organic body placed in the mold. When a higher strength of the ceramic body after sintering is desired, the ratio of the sub-micron grade particles in the ceramic material should be increased.

According to this invention, a ceramic porous body provided with net-like through holes communicated with each other in any directions and a high strength can be manufactured easily and steadily without use of any specially designed apparatus, and also the permeability of the formed holes can be regulated as desired.

BRIEF DESCRIPTION OF THE DRAWINGS

The drawings attached herewith show practical features of this invention.

FIGS. 1(a) and (b) show a first embodiment, wherein FIG. 1(a) shows the manner to produce the product shown in FIG. 1(b), shows the product having through holes opened on every face thereof.

FIGS. 2(a) and (b) show a second embodiment, wherein FIG. 2(a) shows the manner to produce the product shown in FIG. 2(b) shows the product having through holes opened only on the specified faces.

Figure 1A:
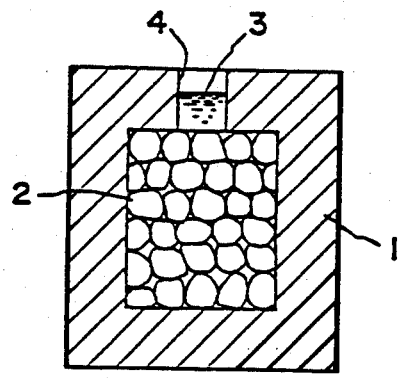

Numerals 1 and 11 indicate gypsum molds, 2 and 12 indicate organic porous bodies, 3 and 13 indicate the slip material poured into the molds, 4 and 14 indicate pouring gates, 5 and 15 indicate the produced bodies, while 6 and 16 indicate the through holes formed in the produced body 5 and 15. A space 17 is formed between the inner wall of the mold 11 and the filled organic foamed body 12. The numeral 18 indicates the closed surface layer formed on the side face of the produced ceramic body 15.

DESCRIPTION OF THE PREFERED EMBODIMENTS

Example 1

A pouring material was prepared by adding 0.3 wt.% of sodium hexa-metha phosphate as a dispersion agent to calcined alumina powder having a mean grain size of 0.5 μm, and adding 15 wt.% of water thereto.

Figure 1B:
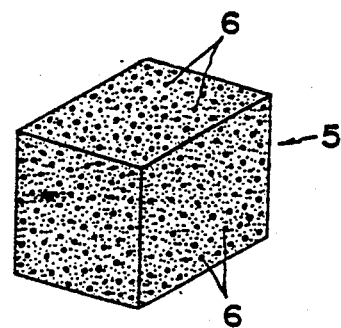

Referring to FIG. 1, the slip 3 was poured from the pouring gate 4 into the gypsum mold 1 having a capacity of 100×50×25 mm previously filled with a urethane foam body 2 (Bridge Stone Co. Product #50) of the same size as the inner size of the mold 1.

After water in the slip was absorbed into the mold, the molded body was taken out of the mold. Then, the molded body was dried at a temperature from 50° C. to 60° C. and then heated at 1600° C. in an oxidizing atmosphere in which the urethane foam body was decomposed. The properties of thus produced ceramics porous body 5 are shown in Table 1.

TABLE 1

| | |
|---|---|
| bulk density | 3.00 |
| permeability | 18.9% |
| comp. strength | 2100 kg/cm$^2$ |
| gas pass. rate | 0.3 l/cm cm$^2$ min atm |

Example 2

A pouring material was prepared by adding sodium hexameta phosphate as a dispersion agent of 0.5 wt. % to stablized zirconia powder having a grain size consisting of 30 wt.% of more than 5 μm and 70 wt.% of less than 5 μm, and adding 14 wt.% of water thereto.

Figure 2A:
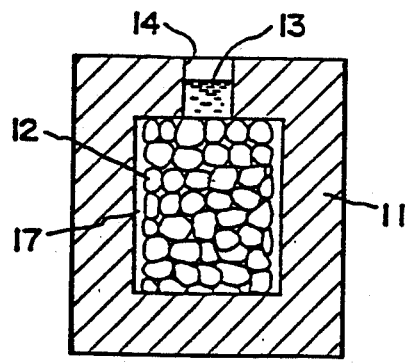
Figure 2B:
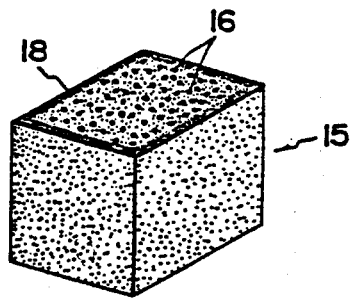

Referring to FIG. 2(b), a urethane foam body 12 (Product #30 of Bridge Stone Co., Ltd.) of 100×46×46 mm size was placed in the center of the cavity having a capacity of 100×50×50 mm of the mold 11 with a space 17 between the inner side wall of the mold 11 and the placed organic foamed body 12. The slip 13 prepared as described above was poured into the mold 11 from the pouring gate 14. After water in the slip 13 was absorbed into the mold 11, the gypsum mold 11 was removed. The molded body was dried at a temperature from 50° C. to 60° C. and then baked at 1600° C. in an oxidizing atomosphere in which the urethane foam body was decomposed.

The properties of the thus produced ceramic porous body 15 provided with closed side surfaces 18 as shown in FIG. 2(b), are presented in Table 2.

TABLE 2

| | |
|---|---|
| bulk density | 4.81 |
| permeability | 19.5% |
| compression strength | 3500 kg/cm$^2$ |
| gas passing | 0.6 l/cm cm$^2$ min atm |

Example 3

Alumina slurry was prepared by adding easter polyacrylate as the dispersion agent of 0.5 wt.% and water of 15 wt. % to calcined alumina powder having a mean diameter 5 μm, agitating the mixture for 1 hr. in a ball-mill, and degassing.

Immediately after pouring the thus prepared alumina slurry into a gypsum mold having a cavity size of 500×100×40 mm into which there was previously placed a urethane foam (Product #13 of Bridge Stone Co., Ltd.) having the same size as the mold cavity, the urethane foam was contracted to a size of 100×100×40 mm. After taking the cast body out of the mold, the cast body was dried at 110° C. for 24 hours, and baked at 1600° C. in which the urethane foam body was decomposed. Properties of the produced ceramic body are shown in Table 3.

TABLE 3

| | |
|---|---|
| bulk specific gravity | 2.8 |
| permeability | 40% |
| comp strength | 1800 kg/cm |
| gas passing rate | 1.2 cm$^3$ · cm/cm$^2$ H$_2$O cm |

Example 4

Alumina slurry was prepared by adding alumina cement of 1 wt.%, polyacrylic ester as the dispersion agent of 0.5 wt.% and water of 18 wt. % to calcined alumina powder having a mean diameter 5 μm, agitating the mixture for 1 hr. in a ball-mill, and degassing.

The alumina slurry was poured into a gypsum mold having a cavity size of 500×100×40 mm into which there was previously placed a urethane foam body (Product #13 of Bridge Stone Co., Ltd.) having the a size of 300×100×40 mm in the contracted state of 100×100×40 mm. After taking out the cast body from the old, the cast body was dried at 110° C. for 24 hours, and baked at 1600° C. in which the urethane foam body was decomposed. Properties of the produced ceramic body are shown in Table 4.

TABLE 4

| | |
|---|---|
| bulk specific gravity | 9 |
| permeability | 27% |
| compression strength | 2000 kg/cm$^2$ |
| gas passing rate | 0.7 cm · cm/cm$^2$ sec H$_2$O cm$^3$ |

What is claimed is:

1. A method of manufacturing a ceramic body having continuous through holes within the body comprising the steps of placing an organic porous material having a three-dimensional net-like construction within a cavity of a gypsum mold, pouring a ceramic slip containing water into said mold cavity to form a cast body, absorbing water contained in the slip into the gypsum mold, and then heating said cast body to decompose said organic porous material and sinter said ceramic cast body, thereby forming a sintered ceramic body having continuous through holes therein formed in the spaces originally occupied by the organic porous material.

2. A method according to claim 1, wherein said organic porous material has the same size and configuration as the cavity of said mold to thereby substantially fill the cavity of the mold.

3. A method according to claim 1, wherein said organic porous material has a size which is smaller than the cavity of said mold to thereby form at least one space between said porous material and a wall of said mold cavity, said step of pouring said ceramic slip comprising pouring the ceramic slip into said space such that the portion of the cast body formed in said space is devoid of said through holes.

4. A method according to claim 1, wherein said mold cavity has internal side walls, said organic porous material having external side walls, at least one of said internal side walls being spaced from at least one of said external side walls to form a space therebetween, said step of pouring said ceramic slip comprising pouring the ceramic slip into said space such that the portions of the cast body formed in said space is devoid of said through holes.

5. A method according to claim 1 comprising utilizing an organic porous material which is contractable, contracting said organic porous material such that it is in a contracted state within said mold cavity, and controlling the permeability of the sintered body by controlling the extent that said organic porous material is contracted within said mold cavity.

6. A method according to claim 5 comprising contracting said organic porous material before pouring said ceramic slip.

7. A method according to claim 5 comprising contracting said organic porous material after pouring said ceramic slip.

8. A method according to claim 1, wherein said organic porous material is selected from the group consisting of urethane foam and polyethylene foam.

9. A method according to claim 1, wherein said heating is effected at a temperature of about 1600° C.

10. A method according to claim 1, comprising regulating the direction of continuous through holes formed in the sintered body.

11. A method according to claim 10, wherein the organic porous material is placed in the mold so that apertures in the organic porous material communicate with apertures in an inner face of the gypsum mold, thereby regulating the direction of continuous through holes formed in the sintered body.

12. A method according to claim 1, further comprising regulating the distribution of continuous through holes formed in the sintered body.

13. A method according to claim 12, wherein the distribution of continuous through holes formed in the sintered body is regulated by contracting the organic porous material, thereby regulating the number of continuous through holes formed in the sintered body without varying through hole diameter.

14. A method according to claim 13 wherein the organic porous material is contracted to form one-tenth to one-half of the original volume of said organic porous material.

15. A method according to claim 12, wherein the distribution of continuous through holes formed in the sintered body is regulated by placing the organic porous material in the cavity of the gypsum mold in a preferred direction.

* * * * *